United States Patent

[11] 3,594,750

| [72] | Inventor | Erich Mueller<br>Berlin, Germany |
|---|---|---|
| [21] | Appl. No | 728,645 |
| [22] | Filed | May 13, 1968 |
| [45] | Patented | July 20, 1971 |
| [73] | Assignee | Continental Elektroindustrie<br>Aktiengesellschaft Akania-Werke<br>Berlin, Germany |
| [32] | Priority | May 12, 1967 |
| [33] | | Germany |
| [31] | | S 1 09 860 |

[54] DEVICE FOR MEASURING TEMPERATURE OF MOLTEN MATERIALS AND METHOD OF USE
9 Claims, 2 Drawing Figs.

[52] U.S. Cl. ................................................ 340/227.1,
73/358, 116/105, 136/234, 164/4, 337/17, 340/227
[51] Int. Cl. ....................................................G01k 17/00, G08b 17/06
[50] Field of Search............................................ 340/227, 227.1; 116/104, 105, 106, 114.5; 73/358, 362; 337/15, 17, 401; 102/28; 164/4; 136/230, 234

[56] References Cited
UNITED STATES PATENTS

| 2,270,226 | 1/1942 | Pease ........................... | 116/105 |
| 1,043,228 | 11/1912 | Harrington et al............ | 116/105 |
| 3,105,229 | 9/1963 | Sturm........................... | 340/227.1 |
| 3,277,824 | 10/1966 | Bankston...................... | 337/17 X |
| 3,396,580 | 8/1968 | Cole.............................. | 136/234 X |

FOREIGN PATENTS

| 974,070 | 11/1964 | Great Britain................ | 136/230 |

Primary Examiner—John W. Caldwell
Assistant Examiner—Scott F. Partridge
Attorney—McClure and Weiser ABSTRACT: The temperature in a melt is measured by introducing or casting into the melt a device which releases a wireless signal for detection outside the melt at a preset temperature. The device operates by means of a fuse contact which upon melting at a preset temperature activates a signal source.

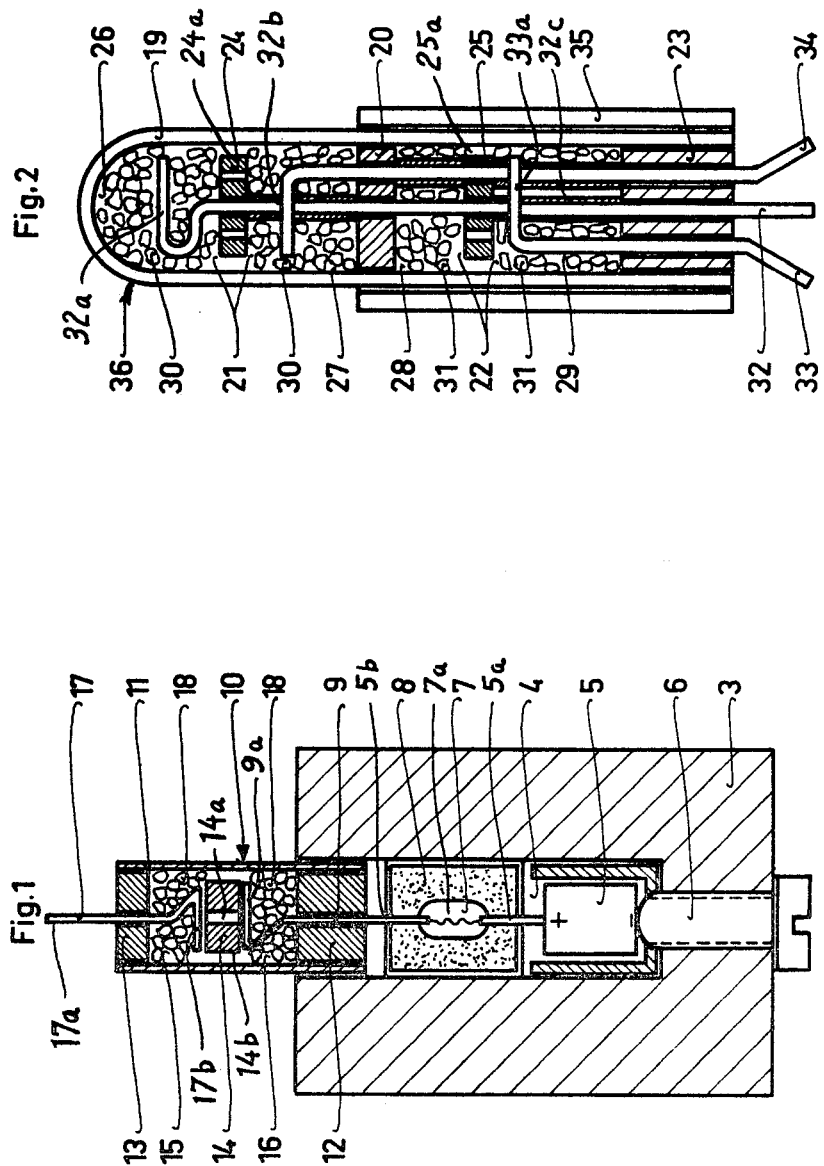

DEVICE FOR MEASURING TEMPERATURE OF MOLTEN MATERIALS AND METHOD OF USE

The present invention relates to a new device and method for measuring the temperature of molten materials by use of a casting device. More particularly, the invention relates to a new device and method for the measuring of the temperature of molten metals such as iron being refined in a converter.

The temperature of molten iron contained for refining in a converter, may be measured by means of a thermocouple. It is thereby necessary to interrupt the refining operation and to tilt the converter into an approximately horizontal position, because it is otherwise not possible to insert the measuring lance fitted with the thermocouple into the iron melt. In order to keep the cost of tilting and of the loss of time caused by the interruption of the refining process as low as possible, generally only one measurement of the temperature of the iron melt is made prior to the beginning and another is made after termination of the refining operation. If the temperature measured at the end of the refining operation deviates appreciably from the predetermined or desired temperature, it is necessary to continue blowing air or to add a charge of suitable additive material, which in each case requires returning of the converter into its upright working position.

In order to overcome the loss of time and to reduce the high cost of measuring the temperature of the molten iron in the converter by the above described method using an immersion lance, it has been proposed to build thermocouples permanently into the liner of the converter as a means for continuously measuring the temperature over the course of the refining operation. Due to the limited durability of the known thermocouples and because of the considerable wear of the liner material of the converter, this method of measuring the temperature has so far not found any general practical application.

The known optical measurement of the temperature of the iron melt by means of optical pyrometers does not provide exact temperature values because the light radiation emitted by the molten iron is affected by the slag, the smoke and dust formed and released during the refining operation. Exact measurement of the temperature can therefore heretofore only be achieved by the use thermocouple. a thermocouple In order to avoid the time-consuming tilting and/or interruption of the refining operation for the insertion of the thermocouple into the melt, it has been proposed to combine the thermocouple with a casting body. The casting body may be made, for instance, of cast iron, which is fitted with a thermocouple. The projecting ends of the thermocouple are connected to a conductor for leading the voltage of the thermocouple to a suitable measuring instrument provided outside of the converter. The disadvantages of this method of measuring the temperature are, on one hand, its high cost and, on the other hand, the limited durability of the connecting conductor. The high cost is caused by the fact that in each single temperature measurement one thermocouple and the connecting measuring conductor of considerable length are lost and destroyed. The limited permanence under operating conditions of the connecting conductor also prevents generally an exact temperature measurement because the build-up of the thermo voltage is, the same as the temperature measurement, a time dependent effect, whereby the life of the connecting conductor is often shorter under the prevailing operating conditions than the time required for the buildup of the thermo voltage. In addition thereto, the connecting is also chemically affected during the blowing operation of the converter with the result that, for instance, a considerable change of the thermo voltage may be produced.

It is therefore an object of the present invention to provide a device and method for the measurement of the temperature in a molten material, which do not have the disadvantages of the known methods and devices.

It is another object of the invention to provide a new method for measuring the temperature in a molten material, and especially in an iron melt in a converter, which method is exact and can be effected without interrupting the refining operation of the iron or other treatment of the melt.

Another object of the invention is the provision of a new device and means which make possible the exact measurement of the temperature in melts without the need for interrupting refining operations or other treatment of the melt.

Other objects of the invention will become apparent from the attached drawings and from the following detailed description of the invention.

The objects of the invention are achieved by a method which comprises introducing into a melt of a metal a casting device which is capable of emitting wireless signals in relation to and dependent on the temperature of the molten material forming the bath and receiving by suitable means the signal or signals emitted by the casting device,, whereby each of said signals represents and is actuated at a certain temperature value. Suitable signals to be emitted are, for instance, explosions or detonations effected in the melt when a predetermined temperature of the melt or bath of molten materials is reached or exceeded. The sonic energy emitted by the detonation may be readily detected and received by means of suitable physical sonic receivers or microphones or the like, positioned outside of the converter. If desired, any other form of emitted radiation or energy may be utilized in or adapted for the purposes of the present invention. For instance, there may be utilized color or gas indicators or electromagnetic, optical or other acoustical signals which are activated and emitted from the casting device, when one or several predetermined temperature values are exceeded in the bath of the melt, whereby the signals or emissions may be detected or received by the conventional measuring devices or detectors for the particular emission or signal.

The attached drawings illustrate a preferred embodiment of the casting device of the invention which utilizes an explosive as the indicator means and which is particularly adapted for use in molten iron, especially in converters.

FIG. 1 is a vertical section of an embodiment of a preferred casting device of the invention.

FIG. 2 is a vertical section of a contact device which is adapted to activate two different signals in a casting device of the invention at two different temperatures.

The casting device of the invention is, in its most elementary form adapted to indicate a single temperature value, so that its signal, or absence thereof, respectively, provides a simple positive or negative indication whether the bath of the molten material has a temperature below or above the temperature to which the casting device is set. If the temperature of the molten material is below the set temperature value, the casting device provides no or only a delayed signal. On the other hand, if the temperature of the molten material is above the set temperature value, the signal of the device is noticeable very rapidly In many cases such simple positive or negative indication of the temperature of the melt is completely satisfactory, for instance, where the molten iron must achieve in a converter a certain predetermined temperature toward the end of the air blowing phase or refining operation, respectively. If desired the course of the temperature in a given blowing or refining operation may be observed over the full length of the operation by introducing successively at predetermined time intervals a plurality of the casting devices of the invention. Instead of using a single type of casting devices having one preset activation temperature, one may use also two or more different casting devices, each being set to a different activation temperature and, if desired, each being designed to give a different signal, so that the signal or signals detected by the measuring or detecting equipment may be coordinated to the particular casting device being activated at the prevailing temperature of the bath of the melt, thus giving an exact indication of the temperature. If the signals provided by the various casting devices having different activation or release temperatures are identical, exact temperature indications may still be obtained by successively introducing the members of a series of casting devices, preferably in a certain order and spacing, e.g. by starting with the device set at the lowest expected temperature, followed by the devices set at increasing higher temperature values; or, vice versa, one may start with the device set at the highest expected temperature, followed by devices of gradually decreasing temperature values; or, if desired, the temperature may be determined by bracketing, using one device for the highest and one for the lowest expected temperature and thereafter using those devices set to temperature values thereinbetween to the required degree of accuracy.

If desired, a given casting device of the invention may also be set to two or more different temperatures values, so that two separate signals are released, when the higher of the two temperature values is exceeded in the bath of the melt. This type of device indicates that the temperature of the melt is below the lowest of two temperature values for which the device is set, if no signal is received. If one signal is immediately received after immersion of the device into the melt, the device indicates a temperature in the range between the two temperature values for which the device is set. If two signals are received, the device indicates that the temperature of the melt is higher than the highest value for which the device is set.

A preferred embodiment of the casting device of the invention comprises preferably a chamber in which are arranged one or more signal sources, which are secured against the effects of the molten material or activated, respectively, by fuses or fuse contacts, respectively. The melting points of these fuses are thereby selected in such a manner that they correspond to certain desired temperatures of the baths of molten materials in which the device is to be used. The chamber contains preferably a powder or explosive charge, or, if desired, acoustical, optical or color signal means may be arranged in the chamber. The activation of the signal means or the release of the signal, respectively, may also be effected electrically by the use of a source of electrical current. In this case, the current supply may be switched in by the fuse or fuse contact, respectively. The activation of the signal means may also be effected by the use of thermocouples or relay circuits.

It was found, however, that the simplest and most convenient manner of setting the temperature values at which the signal sources are activated, comprises the use of metal alloys which have a melting point corresponding to the temperature which is to be determined by the device. Many such alloys, e.g. the two component alloys on the basis of manganese and sulfur; tin and zirconium; lead and titanium; silicon and zirconium; aluminum and cobalt; nickel and titanium; iron and tungsten, or alloys derived therefrom and containing three or more metal elements, have a melting point in the range of temperatures corresponding to those of the molten iron in the refining operation, for instance, in a converter. Melting temperatures of the alloys in the range from about 1500 to 1650° C. may be readily and very precisely achieved by the proper choice of the kind and relative ratios of the various mentioned alloying components.

The metal alloy, serving as the fuse or fuse contact, is preferably arranged in or placed into a ceramic protective tube which projects from the casting device. In a most preferred embodiment of the device, the fuse contact of the metal alloy arranged in the above-described manner closes, when it melts, two contacts of a heating means, strip or a wire, which is arranged in the chamber of the device and electrically connected in series with a battery or a charged capacitor or condenser, likewise contained in the chamber of the casting device. The said heating wire is contained in or extends into a detonator comprised in a charge of power or explosive and initiates the detonation when it is electrically connected to the source of current by the melting of the fuse contact. The sonic signal caused by the explosion is then received on the outside of the bath of the molten material or of the converter, respectively, or the like, as a means for indicating the temperature in the manner described hereinbefore. If the temperature of the bath of molten material remains for an extended period of time below the lowest temperature value for which the casting device is set, the powder or explosive charge is of course not exploded immediately. As time goes on, the casting devise heats up and finally melts the alloy, resulting in a delayed explosion of the charge. In order to be able to differentiate and distinguish the explosion initiated by the melting of the fuse or fuse contact of the metal alloy from that caused by the heating of the casting device and by the self-ignition of the explosive charge, it is desirable to design the contact device containing the fusible metal alloy in such a manner that it assumes as rapidly as is possible the temperature of the bath of molten material. On the other hand, the construction of the casting device should be such that the explosive charge is insulated sufficiently to delay its heating to the self-ignition temperature long enough to provide between these two possible signals a time period which is sufficiently long to permit distinction of the two signals as to their significance in the temperature measuring operation.

Referring now to FIG. 1, a representative embodiment of the casting device of the present invention comprises heavy housing 3 of steel or cast iron, having a central bore hole or 4 $ at the bottom of which is arranged dry cell battery 5. The battery may be electrically connected directly to housing 3, or it may be electrically insulated from the housing, as shown in FIG. 1. In this case, one of the terminals of battery 5, e.g. the negative terminal is brought in electrically conductive connection to the housing just before the casting device is to be used. This can be achieved by the insertion and fastening of safety screw 6, as shown in FIG. 1. The other terminal of battery 5 is electrically connected by conductor 5a to one end of heating wire 7a of detonator 7. The detonator is contained in the charge of powder 8.

At the top end of the bore of housing 3 is inserted contact device 10, so that its major portion projects freely from the housing 3. Contact device 10 comprises tube 11, which is made from a heat resistant electrical insulator, preferably from ceramic and which is closed at both ends by ceramic plugs 12 and 13, respectively. Within tube 11, about halfway between said ceramic plugs 12 and 13, is provided spacer 14, which has a circular cross section of a diameter somewhat smaller than the inner diameter of tube 11, leaving ring-shaped passage 14b between the spacer and inner wall of tube 11. The spacer 14 divides the interior of tube 11 in two chambers, viz. upper chamber 15 and lower chamber 16. The spacer 14 is made from an electrically insulating material and preferably from a ceramic material and defines coaxial bore 14a. Into the lower chamber 16 projects the inner electrode 9, with its lower shaft contained in and projecting through ceramic plug 12 and its lower free end electrically conductively connected to the upper end of heating wire 7a by conductor 5b. Into the upper chamber 15 projects the outer electrode 17, with its free upper end extending through ceramic plug 13 to the outside of conduct device 10. Both electrodes 9 and 17 are free from insulation and the ends of the electrodes contained in chambers 15 and 16, respectively, have preferably a circular or ringlike-shape as shown at 9a and 17b in FIG. 1. The electrodes 9 and 17 are made from a metal or alloy which has a very high melting point, preferably high enough to withstand the effects of the temperature of the bath of molten material in which the casting device is to be used.

The parts of the electrodes 9 and 17, contained in chambers 15 and 16, respectively, are imbedded in granulated contact metal 18, filling the two chambers 15 and 16, respectively. The size of the granules of metal is chosen so that each filling is retained in its respective chamber independently of the position or orientation of the casting device, so that the possibility of the formation of electrically conductive contact between electrodes 9 and 17 by shifting or displacement of the metal granules is safely excluded. The metal granules comprise a metal or metal alloy, selected on the basis of its melting point so that it melts at a predetermined temperature in the range to be measured or determined as described hereinbefore.

When the above-described casting device is thrown into a molten metal bath, e.g. into a converter, the free uninsulated end of outer electrode 17 projecting from the contact device 10 is electrically, conductively connected to housing 3 or safety screw 6, respectively, by the molten metal surrounding the casting device. This means, especially together with the use of the above-described safety screw 6 assure an especially high degree of safety in the handling and use of the charged casting device. When the temperature of the bath of molten material, into which the above-described casting device has been thrown is high enough, the granules of metal 18 melt and the molten metal or alloy flows through the circular space 14b between spacer 14 and tube 11 and through tubular bore 14a, respectively, establishing the electrical contact between electrodes 9 and 17, and closing the electric circuit between battery 5 and heating wire 7a. The heating wire is heated to glow which initiates detonator 7 and in turn sets off the powder or explosive charge 8 to result in the desired detonation which is detected outside the bath of molten material in the above-described manner. The ringlike configuration of the inner ends of the electrodes 9 and 17, respectively, assures with the particular design of the contact device, that electrical contact is established between the electrodes 9 and 17 by the molten metal granules 18 in any case and independent of the particular position or orientation of the casting device or contact device, respectively.

In order to prevent damage to the contact device 10, e.g. during shipping and/or during the insertion or throwing into the melt, the casting device may be provided with corresponding cover means or with prongs, or the like, which protects the contact device 10.

Another embodiment of the contact device may be used in the casting device of the invention, which is set for two different temperature values. This type of contact device is illustrated by way of example in FIG. 2. Contact device 36 comprises tube 19 which is made from an electrical, fire resistant insulator, preferably from ceramic, and which is closed at its upper end and which is divided by ceramic divider wall 20 in the two contact spaces 21 and 22, respectively. The lower, open end of the tube 19 is closed by a plug of fire resistant insulating material 23. Each of contact spaces 21 and 22, respectively, is divided by spacers 24 and 25, respectively, in two chambers 26 and 27, and 28 and 29, respectively. Spacers 24 and 25 have, as described before, a diameter somewhat smaller than the inside diameter of the tube 19, so as to leave ringlike spaces 24a and 25a, respectively, between the circumference of the spacers and the inner wall of tube 19. The spacers are furthermore provided with coaxial bores, likewise connecting the chambers formed by the spacers. Chambers 26 and 27 are filled with a granulated metal or metal alloy 30, respectively, of a predetermined melting point of one value, while chambers 28 and 29 are filled with granule of metal or metal alloy 31 of another predetermined melting point. The bores and spaces between the chambers and the solid granulated alloys are of such relative proportions that the granules can not pass in or fill said bores and spaces into the chambers. Through the lower plug of insulating material 23 is lead electrode 32, its upper ringlike end 32a projecting into the upper chamber 26 and its lower free end being conductively connected to the housing of the casting device (not shown). Electrode 32 is provided in chambers 27 and 29 with tubular electrical, fire resistant insulator 32b and 32c, respectively, e.g. of ceramic material. In chambers 26 and 28, electrode 32 is unprotected and without said insulator, so that it is free to establish electrical contact with the metal contained in these chambers.

Electrode 33 is likewise led through the insulating plug 23 at the bottom, with its ringlike upper and located in chamber 29 and its lower end connected to a heating wire (not shown), forming part of a detonator as described hereinbefore. A third electrode 34 is led in insulating fashion through chambers 28 and 29, with its uninsulated, ringlike upper end located in chamber 27 and its lower free end projecting through insulator 23 at the bottom, is conductively connected to a second heating wire (not shown). Each of the mentioned detonators is located in a separate explosive charge, which are in turn contained in a housing or shell including a battery etc. as described hereinbefore.

For the operation of the above-described device, it is assumed by way of example, that the melting point of the metal granules 30 contained in chambers 26 and 27 is lower than that of the metal granules 31 contained in chambers 28 and 29, for instance, 1550° C. and 1600° C., respectively. If the device is cast into a bath of molten material which has a temperature between the melting points of contact metal 30 and contact metal 31, the metal granules 30 in the upper chambers 26 and 27 melt, and the electrodes 32 and 34 are electrically connected and the circuit containing these electrodes and the corresponding heating wire and battery is closed resulting in the detonation of the coordinated explosive charge in the manner described hereinbefore.

If the bath of the molten material, into which the device is cast has a temperature above the melting point of the higher melting metal granules 31, both contact metals 30 and 31 melt, conductively connecting both electrodes 33 and 34 with electrode 32, closing and activating both circuits with both heating wires and resulting in the detonation of both explosive charges. The contact metal 30, having the lower melting point melts thereby a little faster, providing the desired contact between electrodes 34 and 32 a little earlier, so that the two explosions occurring at different time periods can be detected without difficulty as distinct separate explosions. In those cases, where the temperature of the bath of molten material is considerably higher than the melting points of the two contact metals 30 and 31, and the above-described distinction tends to be decreased, one can use the expedient of delaying the access of the heat to the higher melting contact metal 31 by the use of a separate, partially insulating protective tube 35, covering the lower portion of tube 19 opposite chambers 28 and 29, containing the higher melting contact metal 31. In this manner, the time differential between the two detonations can be increased and the second explosion can be detected as separate, distinct explosion as described before. Protective tube 35 may consist of a heat resistant metal or material, respectively, or it may be made of a metal which melts off in the bath of molten material.

As is apparent, in the embodiment of FIG. 2 of the contact device, there is no electrode projecting to the outside for contact with the bath of molten metallic material, wherein the device is contained, as is illustrated in FIG. 1 with respect to outer electrode 17. It is of course, possible, to modify the embodiment of the contact device of FIG. 2 in such manner that, for instance, the central electrode 32 is led to the outside for contact with the bath of the metallic melt with circuits similar to those shown in connection with FIG. 1. On the other hand, it is also possible to modify the contact device 10 in FIG. 1 in such manner, that both electrodes 9 and 17 are contained inside of tube 11 in a manner, similar as illustrated in FIG. 2.

Suitable metals and alloys thereof can be readily selected from prior art literature, such as *Physical Chemistry of Metals*, Darken et al., McGraw-Hill Book Company, 1953; *Structure and Properties of Alloys*, Brick et al., McGraw-Hill Book Company, 1965; and *Constitution of Binary Alloys*, Hansen, McGraw-Hill Book Company, 1958, which are incorporated herein by reference.

I claim:

1. Apparatus for measuring the temperature of a high-temperature melt by producing an acoustic signal in response to melt temperature, said apparatus comprising a casting device containing an explosive charge and adapted to be introduced into said melt, said device including at least one fusible safety, constructed so as to melt at a predetermined ambient temperature, and means including said safety for igniting said explosive charge.

2. The apparatus of claim 1, wherein said casting device also contains a built-in source of electric energy, and said fusible safety constitutes the fuse contact means utilizing the energy from said source to ignite said charge.

3. The apparatus of claim 2, wherein said device comprises a chamber containing said electric energy source, a safety screw adjustably connecting one terminal of said source to the housing of said device, a detonator for said explosive charge including a heating wire, means connecting the other terminal of said source to one end of said heating wire, a pair of contact electrodes on opposite sides of said fusible safety, means connecting one of said electrodes to the other end of said heating wire, the other of said electrodes being adapted to be connected to said housing at least when said device is in and electrically conductive melt.

4. The apparatus of claim 3 wherein said second electrode is connected to said housing even in the absence of said melt.

5. The apparatus of claim 3, wherein said melt serves to establish said connection between the second electrode and the housing.

6. The apparatus of claim 3, wherein said contact electrodes are enclosed in a tube sealed at the outer end with a ceramic plug pierced by said other electrode, said electrodes terminating inside said tube on opposite sides of a spacer which does not quite fill the cross section of said tube, the spaces in said tube on opposite sides of said spacer containing granular fusible contact metal.

7. The apparatus of claim 6, wherein said spacer has a bore hole connecting its said opposite sides.

8. The apparatus of claim 6, wherein said tube is subdivided into two chambers, each chamber containing a pair of said contact electrodes, a spacer between them, and granular fusible contact metal, respectively melting at different temperatures in different ones of said chambers.

9. The apparatus of claim 6 wherein said granular metal is an alloy having a melting point in the range of from 1500° to 1650° C.